United States Patent
Griggs et al.

(10) Patent No.: US 11,277,714 B2
(45) Date of Patent: Mar. 15, 2022

(54) WIRELESS NETWORK

(71) Applicant: Nelson Irrigation Corporation, Walla Walla, WA (US)

(72) Inventors: Travis Griggs, College Place, WA (US); Mark Bauman, College Place, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 63 days.

(21) Appl. No.: 16/925,625

(22) Filed: Jul. 10, 2020

(65) Prior Publication Data

US 2021/0021966 A1 Jan. 21, 2021

Related U.S. Application Data

(60) Provisional application No. 62/874,772, filed on Jul. 16, 2019.

(51) Int. Cl.
*H04W 4/06* (2009.01)
*H04W 48/10* (2009.01)
*H04L 29/08* (2006.01)
*H04L 67/12* (2022.01)

(52) U.S. Cl.
CPC .............. *H04W 4/06* (2013.01); *H04L 67/12* (2013.01); *H04W 48/10* (2013.01)

(58) Field of Classification Search
CPC ........ A01G 25/16; G05B 15/02; Y02A 40/22; H04W 4/06; H04W 48/10; H04L 67/12
See application file for complete search history.

(56) References Cited

U.S. PATENT DOCUMENTS

| | | | | |
|---|---|---|---|---|
| 5,740,031 A | * | 4/1998 | Gagnon | A01G 25/167 700/16 |
| 6,782,310 B2 | * | 8/2004 | Bailey | A01G 25/16 700/284 |
| 7,158,013 B2 | * | 1/2007 | Schwager | H04B 3/54 340/870.02 |
| 7,400,944 B2 | * | 7/2008 | Bailey | A01G 25/16 700/284 |
| 10,359,788 B2 | * | 7/2019 | Gutierrez | G05B 19/042 |
| 2013/0060389 A1 | | 3/2013 | Marsters et al. | |

FOREIGN PATENT DOCUMENTS

WO WO02052790 A2 7/2002

* cited by examiner

*Primary Examiner* — Joshua L Schwartz
(74) *Attorney, Agent, or Firm* — Lowe Graham Jones, PLLC

(57) ABSTRACT

An irrigation system includes a network hub and a plurality of remote terminal units configured for wireless communication with the network hub. The remote terminal units are connected to a device for irrigation control or sensing, such as a valve for a sprinkler. The network hub is configured to transmit a wireless broadcast to the remote terminal units, in which the wireless broadcast includes a plurality of individual packets transmitted in succession, each of the plurality of individual packets including a network identifier associated with the network hub, a time remaining in a broadcast period of time, and an assignment map indicative of an assigned state for each of the plurality of remote terminal units.

31 Claims, 12 Drawing Sheets

Encoding Algorithm

WIRELESS NETWORK

PRIORITY CLAIM

This application claims the benefit of prior U.S. provisional application 62/874,772, filed Jul. 16, 2019, the contents of which are incorporated by reference.

FIELD OF THE INVENTION

The present invention relates generally to wireless networks, particularly including wireless networks for controlling irrigation systems.

BACKGROUND OF THE INVENTION

The control of an irrigation system is an increasingly important task. At a basic level, it is valuable to be able to apply a desired amount of water to the right regions in an agricultural area at the right times. More crucially, with water as a valuable resource, it is important to optimize the timing and the amount of the applied irrigation without waste, and further to facilitate precisely controlled amounts of water to be applied to crops. In larger irrigation systems, a great number of controllers may be spread over wide areas, each of which must be addressed from a centralized system to ensure the opening and closing of valves or the like in order to operate the system in a controlled manner. Where electronic controllers are used, battery or power efficiency is important as well, to ensure that every controller remains active and able to continue to control its associated irrigation device without interruption. Current systems are ineffective to handle these tasks in one way or another.

SUMMARY OF THE INVENTION

In accordance with a preferred version of the invention, an irrigation system includes a network hub and a plurality of remote terminal units configured for wireless communication with the network hub. Each of the plurality of remote terminal units is connected to a device for irrigation control or sensing, such as a valve for a sprinkler. The network hub includes a computer processor and a memory having stored programming instructions operable by the computer processor to cause the network hub to transmit a wireless broadcast to the plurality of remote terminal units.

In one version, the wireless broadcast includes a plurality of individual packets transmitted in succession for a broadcast period of time, each of the plurality of individual packets including a network identifier associated with the network hub, a time remaining in the broadcast period of time, and an assignment map indicative of an assigned state for each of the plurality of remote terminal units.

In some versions, the device for irrigation control or sensing is one or more of a valve, a solenoid, a pressure switch, or a sensor.

In some versions, each of the plurality of individual packets further includes a format type value.

In some versions, a remote identifier is associated with each of the plurality of remote terminal units. The remote identifier may be a remote terminal identifier which identifies a particular one of the plurality of remote terminal units. The remote identifier may also be a device identifier which identifies a particular one of the devices for irrigation control or sensing.

In some versions, each of the remote identifiers is stored in the memory, and the stored programming instructions are configured to cause the computer processor to apply an encoding function to each of the remote identifiers to produce a set of function parameters, and further each of the plurality of individual packets includes the set of function parameters.

In some versions, the encoding function operates to produce a first data size of the set of function parameters which is smaller than a second data size of the plurality of remote identifiers.

In some versions, the encoding function is a hash function.

In some versions, each of the plurality of remote terminal units is configured with a decoding function operable to decode the set of function parameters using a decoding identifier. In some versions, the decoding identifier is the remote identifier. The encoding function may further be configured to produce a unique computed index for each one of the remote identifiers.

In some versions, each of the remote terminal units is configured to transmit a status packet to the network hub in accordance with the unique computed index.

In some versions, each of the remote terminal units includes a current state for the connected device for irrigation control or sensing, each of the remote terminal units further being configured to compare the current state to the assigned state and to cause the connected device to match the assigned state.

In yet other versions, the invention comprises an irrigation system having a network hub, a plurality of remote terminal units configured for wireless communication with the network hub, each of the plurality of remote terminal units being connected to a device for irrigation control or sensing, and each of the remote terminal units having a remote identifier. The network hub preferably includes a computer processor and a memory having stored programming instructions operable by the computer processor to apply an encoding function to each of the remote identifiers to produce a set of function parameters. The stored programming instructions are further operable to cause the network hub to transmit a wireless broadcast to the plurality of remote terminal units, the wireless broadcast including a plurality of individual packets transmitted in succession for a broadcast period of time. Each of the plurality of individual packets includes the set of function parameters and an assignment map, the assignment map indicative of an assigned state for each of the plurality of remote terminal units.

In some versions, the encoding function operates to produce a first data size of the set of function parameters which is smaller than a second data size of the plurality of remote identifiers. In some examples, the encoding function is a hash function.

In some versions, each of the plurality of remote terminal units is configured with a decoding function operable to decode the set of function parameters using a decoding identifier. In some versions, the decoding identifier is the remote identifier.

In some versions, the encoding function is further configured to produce a unique computed index for each one of the remote identifiers.

In some versions, each of the remote terminal units is configured to transmit a status packet to the network hub in accordance with the unique computed index.

In some versions, each of the remote terminal units comprises a current state for the connected device for irrigation control or sensing, each of the remote terminal units further being configured to compare the current state to the assigned state and to cause the connected device to match the assigned state.

In some versions, each of the plurality of individual packets further includes a network identifier associated with the network hub and a time remaining in the broadcast period of time.

Some versions of the invention comprise an irrigation system having a network hub with a computer processor and a memory of stored programming instructions operable by the computer processor to cause the network hub to transmit a wireless broadcast, the wireless broadcast including a plurality of individual broadcast packets transmitted sequentially for a broadcast period of time, and wherein the individual broadcast packets are synthesized using a first set of parameters. The system further includes a plurality of remote terminal units configured for wireless communication with the network hub, the remote terminal units each further comprising a wireless transceiver. A channel activity detector is integrated within the wireless transceiver and configured to detect any of the plurality of individual broadcast packets, wherein the channel activity detector is activated on a periodic basis.

In some versions, each of the remote terminal units further comprises a wireless receiver, wherein each of the remote terminal units are configured to activate each of their respective wireless receivers when the channel activity detector detects one of the individual broadcast packets.

In some versions, the network hub is operable to receive wireless packets using a second set of parameters, each of the remote terminal units further having a wireless transmitter, and each of the wireless transmitters being configured to transmit a status packet using the second set of parameters.

In some versions, the first and second set of parameters each includes an IQ setup, and wherein the first and second set of parameters are assigned orthogonal IQ setups.

In some versions, the first and second set of parameters each includes a spreading factor, and the first and second set of parameters are assigned different spreading factors.

In some versions, the first set of parameters includes a first channel frequency and the second set of parameters includes a second channel frequency, the first channel frequency being different than the second channel frequency.

In yet other versions of the invention, the system includes a network hub, a plurality of remote terminal units configured for wireless communication with the network hub, each being connected to a device for irrigation control or sensing. The network hub includes a computer processor and a memory having stored programming instructions operable by the computer processor to cause the network hub to transmit a wireless broadcast to the plurality of remote terminal units. The wireless broadcast includes a plurality of individual packets transmitted in succession for a broadcast period of time, each of the plurality of individual packets including a time remaining in the broadcast period of time, an assignment map indicative of an assigned state for each of the plurality of remote terminal units, and a set of function parameters, the set of function parameters being usable by the plurality of remote terminal units determine the assigned state from within the assignment map corresponding to each separate one of the plurality of remote terminal units, and further to derive a unique time for providing a status response by each separate one of the plurality of remote terminal units.

In some versions, each of the remote terminal units includes a remote identifier, and the remote terminal units are configured to apply a decoding function to derive a unique index as a function of the function parameters and the remote identifier.

In some versions, each of the remote terminal units is further configured to determine the assigned state based on the unique index.

In some versions, each of the remote terminal units is further configured to determine the unique time based on the unique index.

In some versions, each of the remote terminal units is further configured to determine the assigned state and the unique time based on the unique index.

In some versions, the network hub is further configured to receive the status response from the plurality of remote terminal units during a response period of time, the response period of time occurring after completion of the broadcast period of time.

In some versions, the response period of time further occurs after an actuate period of time, the actuate period of time occurring after completion of the broadcast period of time.

In some versions, the plurality of remote terminal units are further configured to perform an action in accordance with the assigned state during the actuate period of time.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
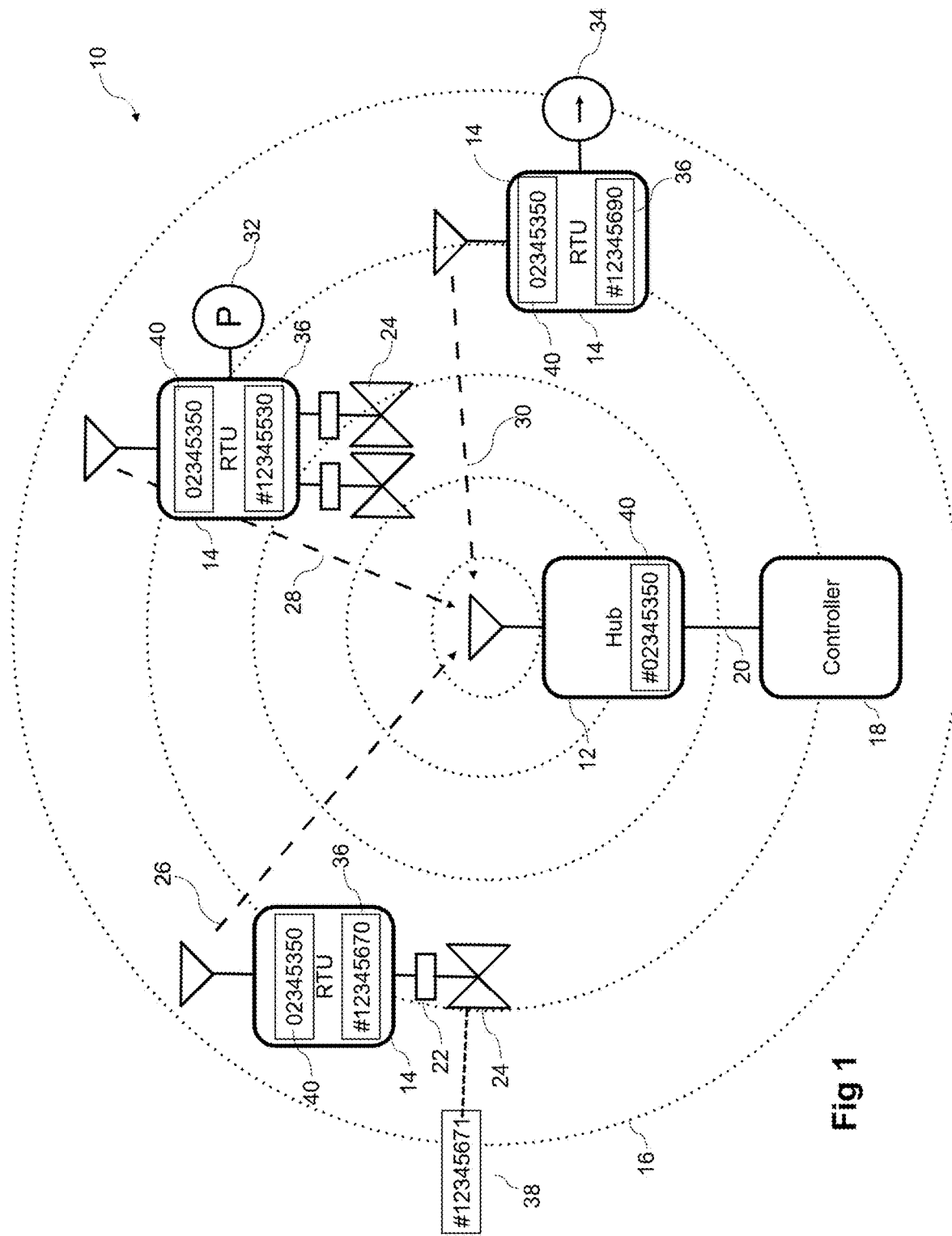
FIG. 1 is a block diagram of a representative wireless network for an irrigation system.
Figure 2:
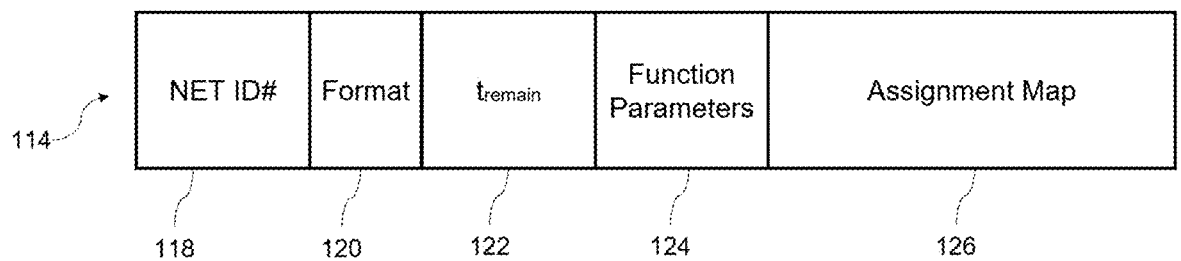
FIG. 2 is an illustration of a representative command packet for use with a preferred wireless network.
Figure 3:
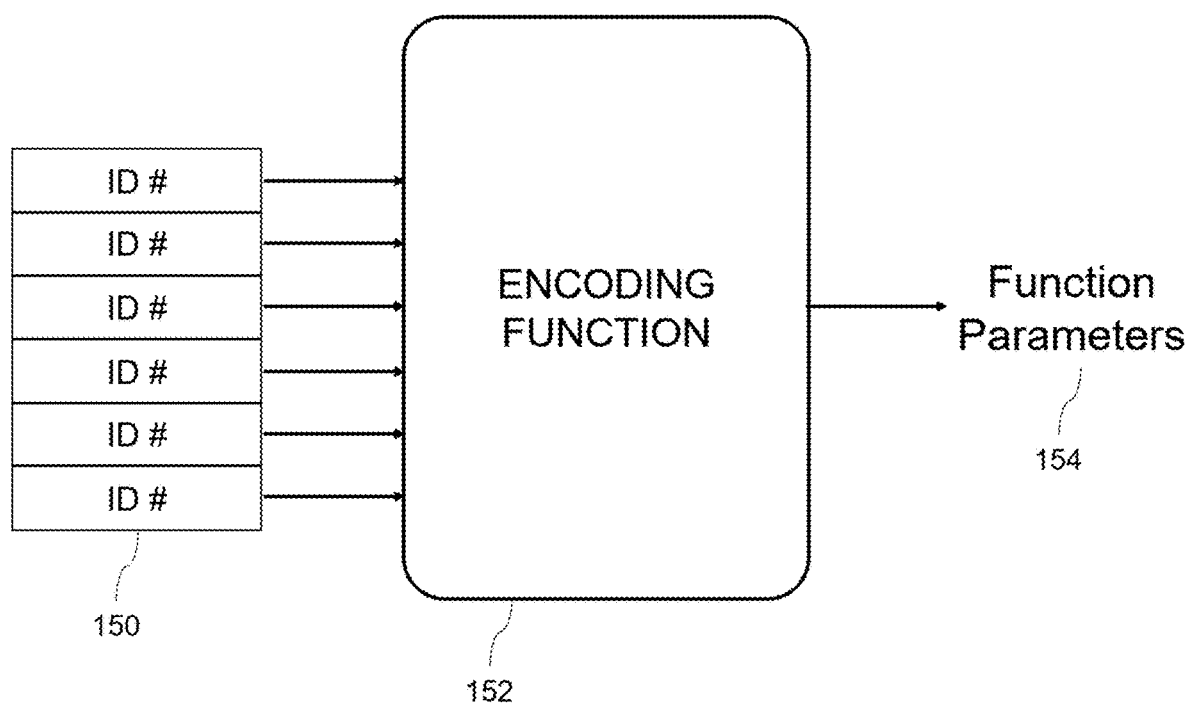
FIG. 3 is a block diagram of a preferred encoding function.

In FIG. 1, a wireless network 10 is shown. The network 10 is designed to provide coordinated, low-latency asynchronous communication and is configured to provide asynchronous data transfer from a network hub 12 to a plurality of remote terminal units or RTUs 14 and synchronous communication from the individual RTUs 14 to the network hub 12 in time sequenced fashion. By design, a network ID 40 is defined as being equal to the hub ID for a given network. This network ID 40 is recorded by each RTU 14 during a network joining process that will be described later in this specification. RTUs 14 are designed for power efficiency and often use battery or solar power as their primary power source.

In the network 10, the hub 12 transmits a wireless broadcast 16 that is graphically represented by a set of concentric rings that originate from the hub 12 (which is graphically intended to be indicated as having a transmitter positioned at the center of the broadcast, and therefore at the center of the set of concentric rings). This broadcast 16 is able to be received by each of the RTUs 14. The broadcast 16 contains information provided by a controller 18 that is transferred over a data bus 20 and delivered to the RTUs 14. The broadcast 16 consists of a plurality of individual data or command packets that are transmitted in rapid succession for a period of time. These individual data packets contain information that is relevant for all the RTUs 14 in the network 10. Each individual data packet contains the same data except that each packet includes a unique time stamp representing an amount of time remaining in the broadcast.

Each RTU 14 contains a wireless transceiver that is configured to communicate with the wireless transceiver in the hub 12. In one example, the wireless transceiver is manufactured by Semtech Corporation with a part number of SX1261. Each RTU 14 is configured to alternate between a low power sleep mode and a channel activity mode to detect activity. Once activity is detected, the RTU 14 will receive and process data provided by a single received packet that is contained in the broadcast 16. Each RTU 14 uses its own ID 36 or valve or sensor ID 38 in conjunction with received data from a broadcast packet to determine its state and to schedule a time to transmit its own status and sensor information back to the hub 12.

The RTUs 14 are configured to transmit this information in the form of a first, second and third status transmission 26, 28 and 30 that are each sent at different times to ensure that they do not collide with one another so that they will each be received by the hub 12.

The network hub 12 is configured to transmit and receive transmissions in accordance with transmission parameters, including a first set of transmission parameters for broadcasting which may be different from a second set of transmission parameters for receiving communications from the RTUs. Thus, the hub 12 may transmit its broadcasts in accordance with a first set of transmission parameters, and the RTUs may transmit their communications signals in accordance with a second set of transmission parameters.

In one example, the first and second transmission parameters may be different from one another, such as by incorporating different modulation types. The terms "normal modulation" and "alternate modulation" are used in this description. The act of having two different types of modulation in the wireless network 10 includes one type of modulation or what is referred to as "normal" to be used for all non-broadcast traffic while the other type, referred to an "alternate", is used exclusively for broadcast 16 (FIG. 1). It should be understood that the term "modulation" in this context can include an IQ encoding method, spreading factor or frequency. In this description, if there is no modulation designation provided, then normal modulation can be understood as the modulation type.

In a preferred example, the status transmissions 26, 28 and 30 are sent using a first type of modulation or normal encoding of quadrature (normal IQ) data while the broadcast transmission 16 uses a second type of modulation or inverse encoding of quadrature data referred to as inverted IQ. In another example, the status transmissions 26, 28 and 30 are sent using a first frequency while the broadcast transmission 16 is sent on a second frequency that is distinct from the first frequency. In yet another example, the status transmissions 26, 28 and 30 are sent using a first spreading factor while the broadcast transmission 16 is sent using a second spreading factor that is distinct from the first spreading factor.

Each RTU 14 is configured for connection to various devices for control or sensing. For example, a first exemplary RTU 14 (given unique ID #12345670) is configured to drive a solenoid 22 that is coupled to a valve 24 to control a flow of water in an irrigation system. Some exemplary RTUs 14 are also shown connected to a plurality of solenoids 22 and valves 24 (see RTU 14 having ID #12345530), a pressure switch or sensor 32 (also RTU 14 having ID #12345530), and a flow transducer or flow switch 34 (see RTU 14 having ID #12345690). The RTUs 14 are each configured to control the state of their associated valve 24 by receiving and processing data from a received packet from the broadcast 16 using the individual ID 36 as a decoding key. In one example, each valve and sensor can be assigned its own valve or sensor ID 38. In some cases, this ID 38 can be based on the RTU ID 36. For example, an RTU ID #12345670 might have two valves with one having a valve ID of Ser. No. 12/345,671 and a second valve having an ID of Ser. No. 12/345,672.

Now referring to FIGS. 1 through 5, the hub 12 contains a wireless transceiver that is configured to communicate with the wireless transceiver in each RTU 14. In one example, the wireless transceiver is manufactured by Semtech Corporation with a part number of SX1261. The hub 12 also contains nonvolatile memory that is used to record a list of RTU IDs 36 of all RTUs 14 that are registered in the network 10. The hub 12 performs a broadcast transmission 16 that is composed of one or more command packets 114 (see FIG. 2) and lasts for a broadcast period of time.

Each command packet 114 includes a compressed network ID value 118 that is a derivative of the network ID 40. The command packet 114 includes a format type value 120 that identifies the purpose and organization of the packet. The RTUs 14 utilize the format type value 120 to identify the packet as a broadcast command packet and check the network ID value 118 with the recorded network ID 40. If there is a match, then the command packet 114 is processed to glean additional information. Otherwise, it is discarded.

The command packet 114 includes a representation of the time remaining value 122 that is left in the broadcast period. This value 122 is used by each RTU 14 to establish a datum for the timing of individual status transmissions 26, 28, 30.

The command packet 114 includes a set of function parameters 124 that are computed by either the controller 18 or the hub 12 using registered RTU IDs 36. Alternatively, the valve or sensor IDs 38 can be utilized instead. These IDs (that is, the registered RTU IDs 36 and/or valve or sensor IDs 38) are stored in a table 150 (see FIG. 3) and used in an encoding algorithm 152 to deliver a set of function parameters 154.

The function parameters 154 preferably include a pattern and a count value. The function parameters 154 are used by a decoding function 156 (see FIG. 4) to deliver a unique computed index 158 for each decoding ID 160 (which, as above, are the registered RTU IDs 36 and/or valve or sensor IDs 38). The computation of the function parameters 154 is implemented using an iterative algorithm that seeks to find a solution that provides a unique computed index 158 for each decoding ID 160 that is included in the table 150 while keeping the function parameters 124 to a minimum value. In one example, the decoding function 156 is a perfect hash function, thereby mapping each of the decoding IDs to a unique index with no repetition. The algorithm 152 seeks to find a perfect hash and continues until a minimal perfect hash has been determined at which point the pattern and count values are stored as the function parameters 154 to be used in subsequent broadcast transmissions 16. In one example, the search continues until the count value of the function parameters 154 becomes equal with the number of IDs that are included in the table 150.

The command packet 114 includes an assignment map 126 that specifies a desired state for all the RTUs 14 registered in the network 10. The map 126 contains individual index ordered assigned states generally indicated by 172, 174, 176 and 178, which represent separate assignment locations for each computed index 158, corresponding to each decoding ID 160 (see FIG. 5). In one example, the individual assignment states 172, 174, 176 and 178 have a size equal to one bit. In another example, the individual assignment states 172, 174, 176 and 178 have a size equal to multiple bits with each bit targeted for valve and sensors in the network 10.

In one example, each RTU 14 in the wireless network 10 is configured to combine the received function parameters 154 with its own unique ID 36 to deliver a computed index 158 that is used to locate an assigned state within a received broadcast map and to schedule a status reply. In another example, each RTU 14 in the wireless network 10 is configured to combine the received function parameters 154 and each valve or sensor ID 38 to deliver the computed index 158 that is used to locate within the assignment map 126 the position of the intended valve or sensor state. This computed index 158 also specifies the order for the status transmission.

The data contained in each command packet 114 remains the same throughout the broadcast transmission 16 with the exception of the time remaining value 122. This value 122 is updated by the hub 12 before sending each individual packet 114.

Figure 6:
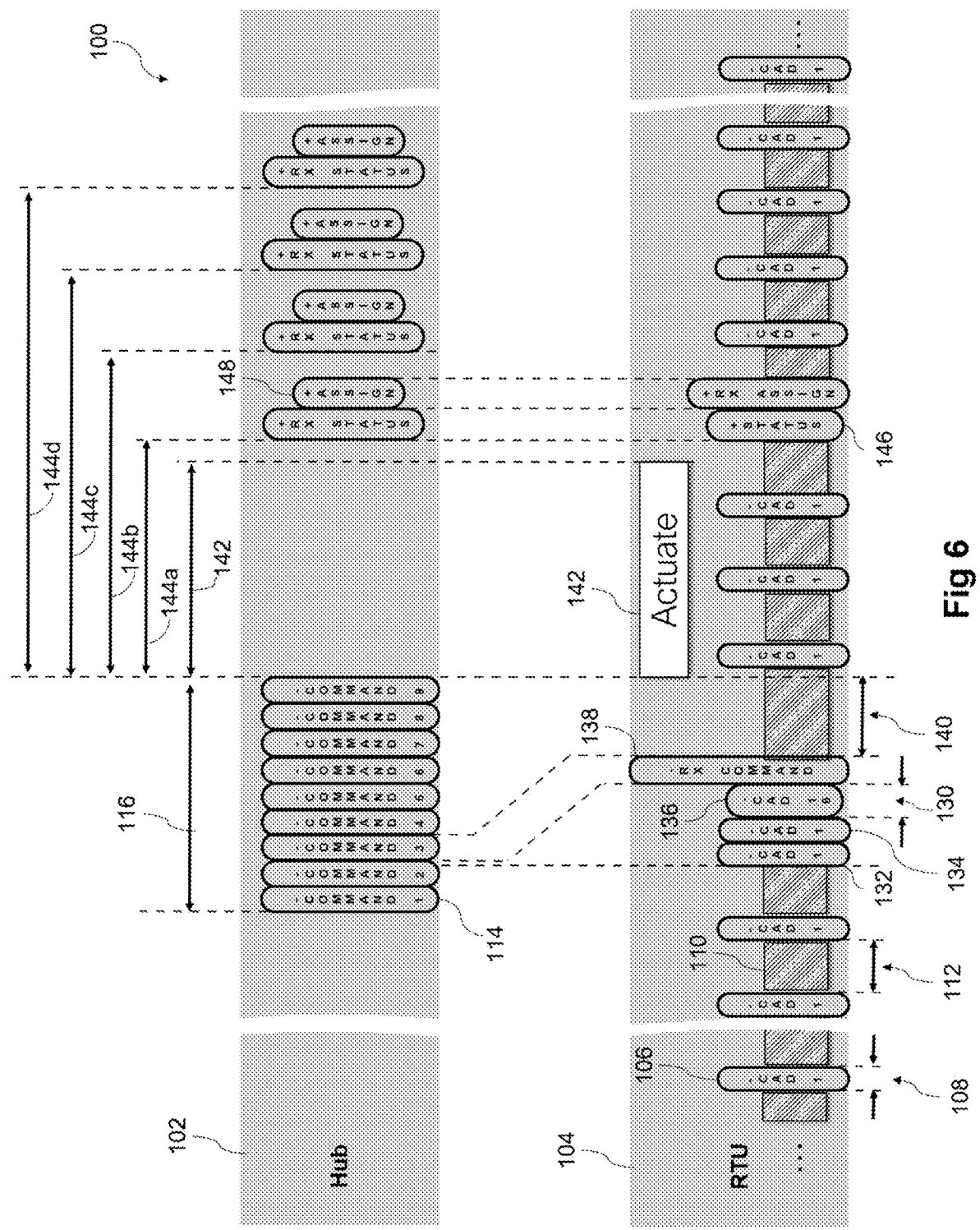
FIG. 6 illustrates a timing diagram for use with a preferred wireless network.

Now referring additionally to FIG. 6, a wireless network timing arrangement 100 is illustrated showing the relationship of hub timing 102 and an example of individual RTU timing 104.

The hub 12 is configured to transmit a broadcast 16 using a plurality of command packets 114. In one example, each of these packets 114 are modulated using an inverted IQ setup for the modulation. The plurality of command packets 114 are transmitted serially and continue for a period of time equal to a broadcast time ($t_{broadcast}$) period 116 shown in FIG. 6.

The RTU 14 has a micro controller and peripherals that are configured in a low power or sleeping state 110 and is configured to remain in this sleep state 110 for a time not to exceed an ignore time 112. In one example, the broadcast time period 116 is four times greater than the ignore time 112 and generally should be greater than 1.5 times longer than the ignore time 112.

The RTU 14 contains a wireless transceiver that is equipped to detect channel activity and will be referred to as CAD ("Channel Activity Detection") for the remainder of this specification. The CAD function is configurable and includes an ability to set an activity threshold, specify a number of symbols to check and specify the type of modulation. The time required to check the CAD is based on the number of symbols to check; a smaller number of symbols can be checked in a shorter amount of time. The act of checking for channel activity for one symbol is referenced in FIG. 6 as a CAD1 operation 106 and takes a time generally indicated by the numeral 108. The RTU 14 is designed to minimize its power consumption by keeping the ratio of CAD1 time 108 to the ignore time 112 to a minimum, and preferably less than 1/100 or less than 1/200. In one example, the CAD1 time 108 is 1.5 milliseconds and the ignore time 112 is 250 milliseconds.

In this example, the RTU 14 includes subsequent CAD operations upon detection of the previous operation using different numbers of symbols that take longer periods of time than the CAD1 time 108. For example, a CAD16 operation 128 takes an amount of time 130 that is significantly longer than the CAD1 time 108 and also consumes more power.

Referring again to FIGS. 1 and 6, each RTU 14 performs a cyclical pattern of waking to perform a CAD1 operation 106 to check for channel activity, and if no activity is detected, then entering a sleeping state 110 for the ignore time 112. The CAD operations in the RTU 14 are configured so that they match the modulation type and setup that is used by the hub 12 for its broadcast transmission 16. This configuration allows the RTU 14 to detect channel activity only using the modulation type used in broadcast transmission 16 rather than other transmissions including the first, second and third status transmissions 26, 28 and 30. In one example, the modulation type used by the CAD setup is an inverted IQ setup which matches the type used in the broadcast transmission 16.

During the broadcast time period 116, while the hub 12 is transmitting the command packets 114, each RTU 14 continues its cyclical pattern of waking to perform CAD operations and then sleeping. The RTU timing 104 shown in FIG. 6 demonstrates this relationship before, during and after the broadcast 16. Before the broadcast 16 (which occurs during the broadcast time period 116) the RTU will periodically wake from sleep to perform CAD operations, then reenter the sleeping state 110 as described above for an ignore time 112. During the broadcast 16, the RTU will wake from sleep and perform a first CAD operation 132. If the operation 132 indicates that broadcast activity is on the channel, then a second CAD operation 134 is performed. If this second operation indicates broadcast activity, then a third CAD operation 136 is performed. If any of these operations does not detect activity, the RTU 14 will reenter the cyclical pattern of sleeping and performing a CAD operation. If all these operations have detected activity, then the RTU 14 will instruct its wireless transceiver to receive a next broadcast command packet 114.

Once the broadcast command packet 114 is received by the RTU 14, data is extracted including the time remaining 122. This time remaining 122 is used by the RTU 14 to calculate a remaining sleep period 140. At this point, the RTU enters into a sleep state for the time specified by the remaining sleep period 140. This method enables minimal power consumption in the RTU 14 by keeping it in a sleep mode while the remainder of the broadcast transmission 16 is allowed to complete during the broadcast time period 116.

After the remaining sleep period 140 has expired, the RTU 14 processes data from the received command packet 138 (which is a received one of the repeated broadcast command packets 114) to extract the function parameters 124 (FIG. 2) and the assignment map 126. The RTU 14 determines its computed index 158 by running its ID and the function parameters 124 through the decoding function 156 (see FIG. 4). The RTU 14 is configured to utilize the computed index 158 to determine the location of the received assignment state with the assignment map 126.

The RTU 14 compares its received assignment state (FIG. 5) to the received command packet 138. If this assigned state differs from its current state, then the RTU 14 will enter an actuate state 142 (see FIG. 6). In one example, during the actuate state 142, the RTU 14 will drive an irrigation valve to match the state received from the command packet 138. In another example, the RTU 14 will initiate a sensor read operation in response to a state received from the command packet 138. In general, during the actuate state the RTU will perform an action in accordance with the state or data received from the command packet.

The RTU 14 resumes its cyclical CAD-followed-by-sleep routine during this actuate state time 142 so that it is able to detect any new broadcast transmissions 16. In the example illustrated in FIG. 6, no additional command broadcast transmissions are provided.

The RTU 14 uses its computed index 158 (FIG. 4) to schedule a specific status response time 144*a*, 144*b*, 144*c*, 144*d* to transmit a new status packet 146. As shown in FIG. 6, four representative response time assignments are indicated as response times 144*a*, 144*b*, 144*c*, 144*d*, corresponding to $t_{response}$ n=1, n=2, n=3, and n=4, in which the indicators n=1, n=2, n=3, and n=4 correspond to four separate RTUs. The break in the timeline illustrated in FIG. 6 indicates that additional RTU status packet assignments may be provided, depending on the number of RTUs in the system.

In one version, the decoded index 158 is used in an equation to schedule a time in the near future (i.e. within the next 30 seconds) at which point the RTU should respond to the broadcast with its own status transmission. For instance, the RTU may calculate its response time as $t_{status}$=index*slot_width, in which the index is the decoded index 158 and the slot width is the time allocated to each separate RTU response. This scheduling calculation preferably occurs after the RTU has slept for a period of time that is specified by time remaining data received in the broadcast packet. This enables all of the RTU's to compute their unique scheduled times using a common reference point (i.e. the end of the broadcast). For example, suppose for a given RTU the received time remaining is 300 msec, the decoded index is 5, and the slot width is 200 msec. Once a broadcast packet is received, the RTU will sleep for 300 msec (this keeps it from receiving additional packets which are unnecessary). When it awakes, it takes the decoded index of 5, and multiplies it by the slot width is 200 msec giving a scheduled status transmission in 1000 msec.

As seen in FIG. 6, because each RTU is given a unique index 158, the index 158 is used to distribute the volunteer status transmissions from the RTU during periods where there are no broadcasts, by scheduling in the future such that each of the RTU's will transmit at a time relative to the last broadcast in direct proportion to their individual index. These transmissions are preferably evenly distributed over a period of time within the non-broadcast period. Thus, using the decoded index provides a scheduling for the response packets to avoid collisions by effectively slotting the responses.

The packet 146 is received by the hub 12 which responds with a response packet 148. In a preferred example, the response packet 148 includes assignment information as a form of redundancy. This assignment information preferably includes the same assignment state as described above with respect to the broadcast, but in this case it is provided within the response packet 148 from the hub directed to the particular RTU in response to the status packet 146 from the particular RTU. The RTU 14 will continue its cyclical CAD-followed-by-sleep routine as it anticipates new broadcast transmissions 16.

Figure 4:
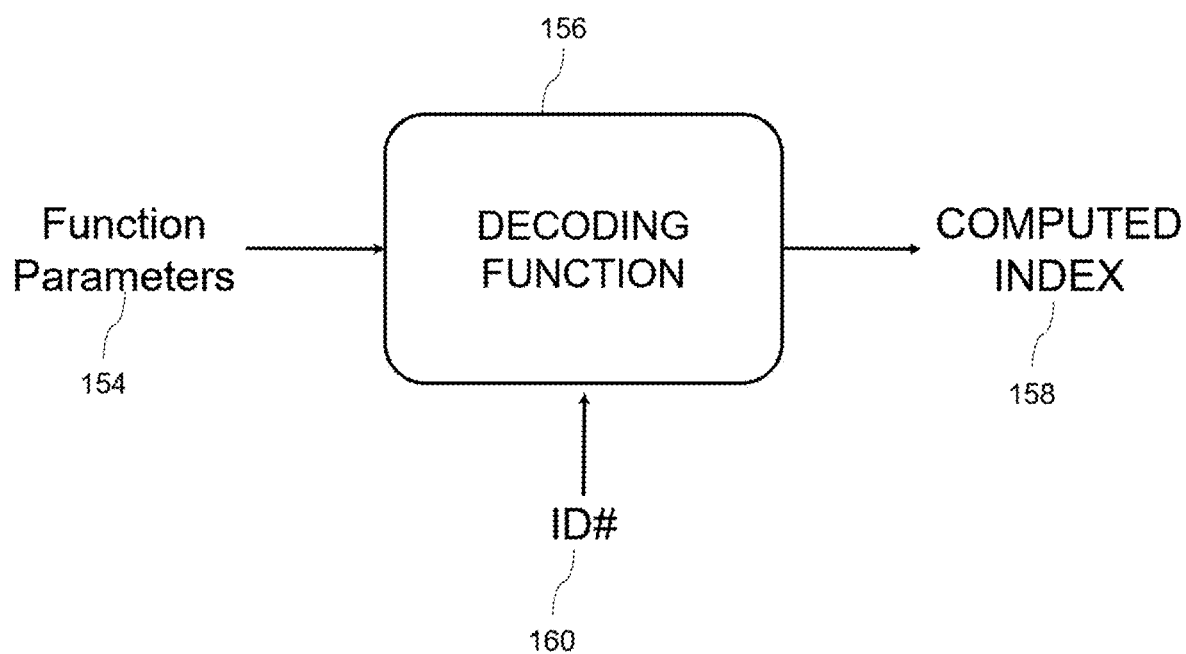
FIG. 4 is a block diagram of a preferred decoding function.
Figure 5:
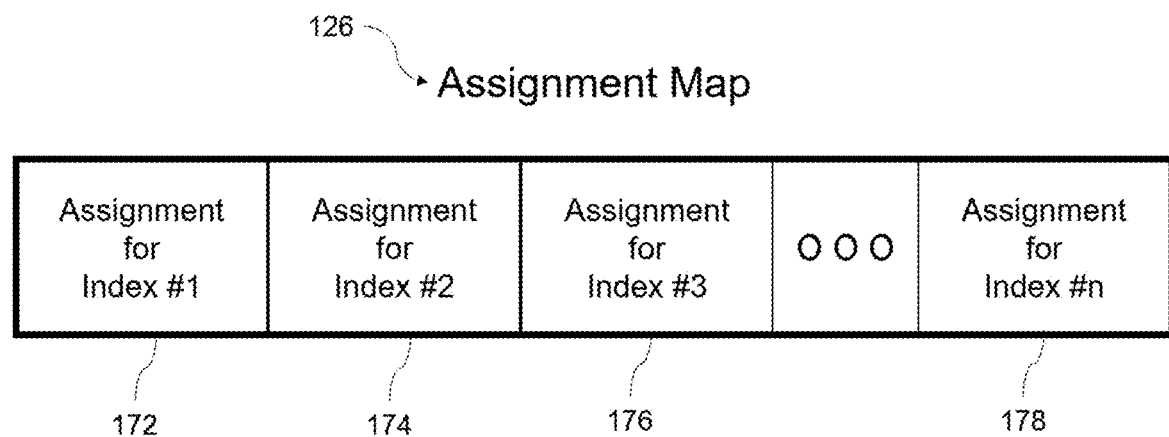
FIG. 5 is a block diagram for a representative assignment map indicating desired states for devices in the wireless network.

Other RTUs 14 respond in a similar manner as described above, but at different times according to their specific computed index 158 (FIG. 4). Operation of the hub 12 is illustrated in flow-chart form in FIGS. 7, 8 and 9.

Figure 7:
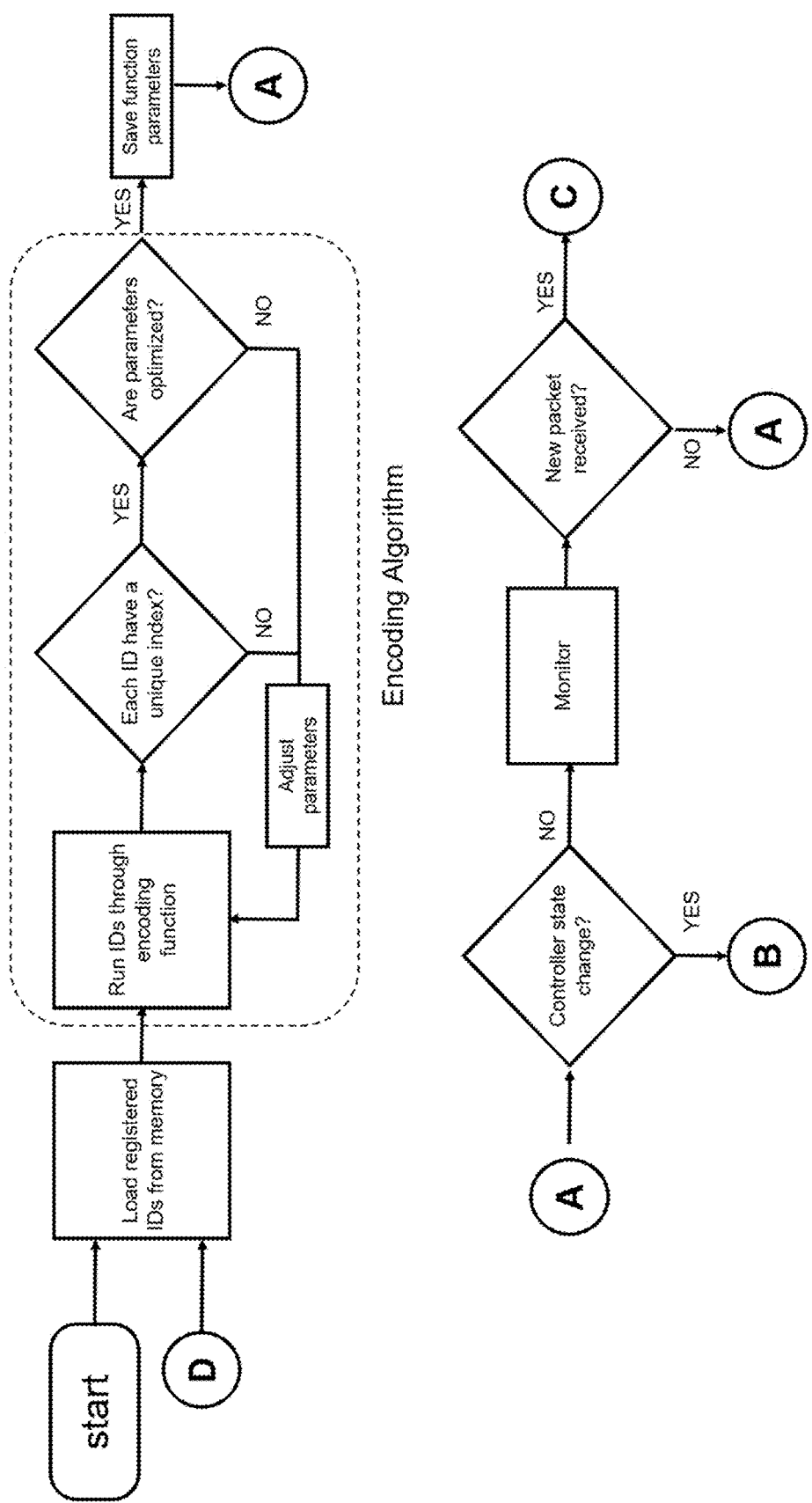
FIGS. 7-12 illustrate flow diagrams (with indicated connections to one another) for a preferred method of operating a wireless network.

Referring now to FIG. 7, upon startup, a computer processor such as a micro controller within the hub loads IDs that have been registered from a memory. In a preferred application, this memory is nonvolatile and is able to retain a list of each ID that has been previously registered. This list of IDs represents a closed set of inputs used in an encoding algorithm.

The processor or micro controller within the hub 12 is configured to process the registered IDs using an encoding algorithm. The goal of this algorithm is to provide a set of parameters that are utilized by a decoding function that is shared by the hub and RTUs in the network to return individual and unique indexes for each RTU in the network. In one example, the set of parameters includes a pattern value and a count value. In this same example, the encoding algorithm seeks to find a solution that provides a minimum count value. This encoding algorithm evaluates each registered ID using a decoding function that is configured to return a unique index value for each registered ID.

In one example case, the decoding function returns an index value by applying a bitwise XOR function to a representation of a loaded ID and a test pattern value and then performing a modulus operation on the result divided by a test count value. In abstract form, this operation can be defined as: index=((ID value xor test pattern) % test count) where % is the modulo operator.

For a specific example, the list of IDs could include a set of IDs {12345670, 12345990, 2345690} as shown in FIG. 1. If we use a test count value equal to the number of IDs, then the test count value would be equal to three. Then, a test pattern value is selected, starting at 0. Applying this combination of test count value and pattern value to the ID numbers yields a set of index values of {1, 0, 0} for the set of IDs so they are not unique. Incrementing the pattern value for a value of one yields a set of index values of {0,2,2} for the set of IDs so they are also not unique. The index values finally become unique when the pattern value is incremented to a value of four yielding an index value set of {0, 2, 1} for the set of IDs. So, in this case, a set of parameter values {count, pattern} that satisfy the uniqueness criteria is the set {3, 4}.

In another example case, a valve ID is designated as an n bit integer, the low bit being 0 or 1 for the first or second valve of the RTU, the high n−1 bits being the unique RTU ID. A decoding function that is a minimal, perfect hash function is applied to the valve ID which produces an integer value. This integer is the lookup index for the valve. In this example, the hash function must not be lossless. For any two valves, there can never be a collision of indices.

Here, the hash or decoding function involves parameters that are applied uniformly for each function invocation. For a given n bit index, V, the function then is f(V)=(V xor pattern) % count. f(V) could alternately use any set of mathematical operations (e.g., bit shift, addition, etc.), as long as for the close input set of values, each is unique.

The hub 12 pattern and count values used for the decoding function are updated each time the closed set of inputs changes (e.g., when a valve is added to or removed from the set of known valves controlled by the system).

In one example, the encoding algorithm includes a search for determining optimal parameters starts with a high count value equal to the one plus the number of IDs multiplied by five. The test pattern value starts as zero. The decoding function is applied to each ID. If a collision is detected, parameters are deemed invalid, and the pattern value is incremented and the search for collision is repeated. When either a) the pattern value reaches the maximum value of the number of bits used in the IDs or b) a perfect hash is detected because no collisions occurred, then the count is decremented by 1, and the pattern value is set to 0. This search continues iteratively, finding smaller and smaller perfect hashes until the search completes when the count value is equal to the number IDs.

Figure 8:
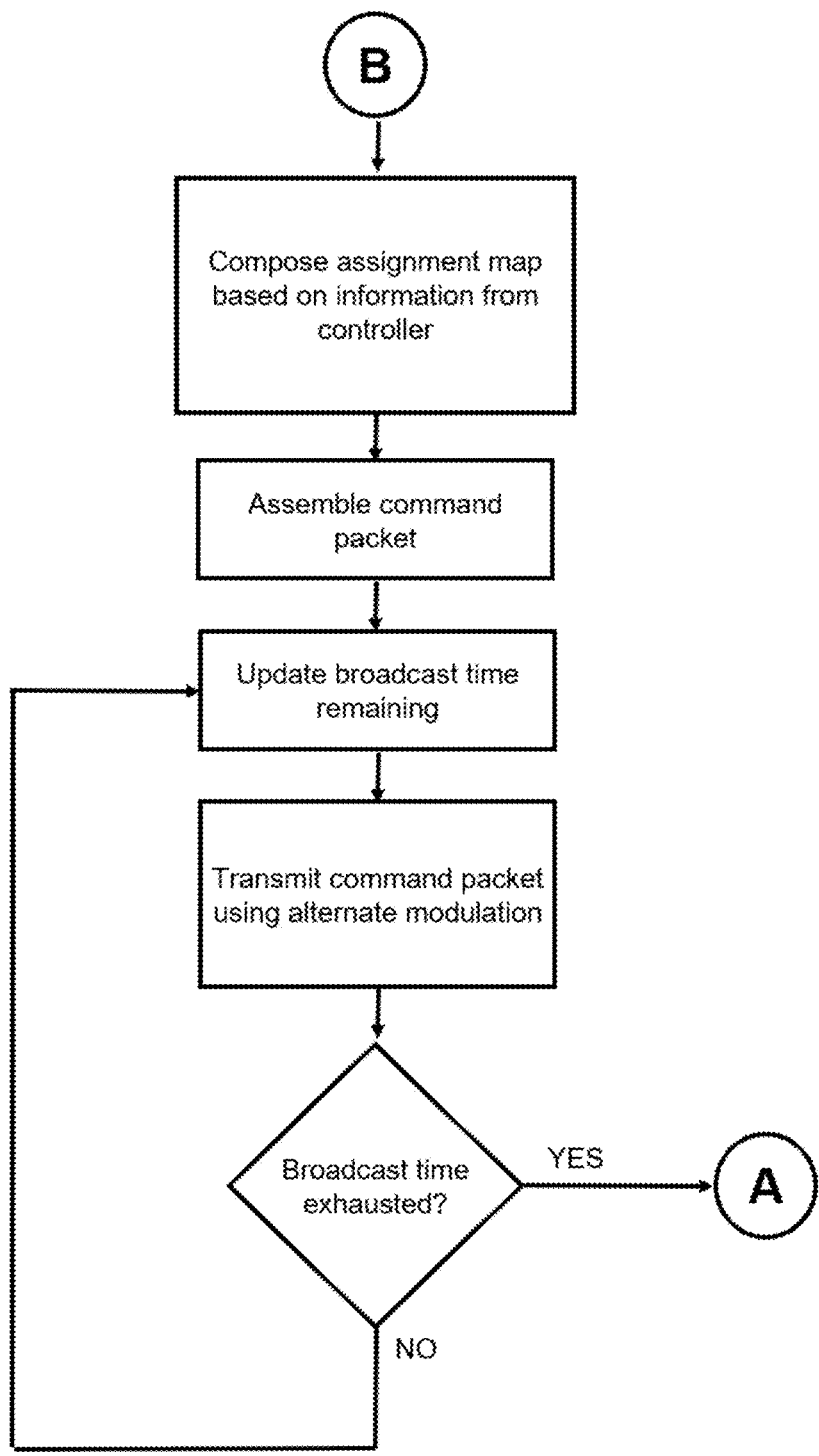
Figure 9:
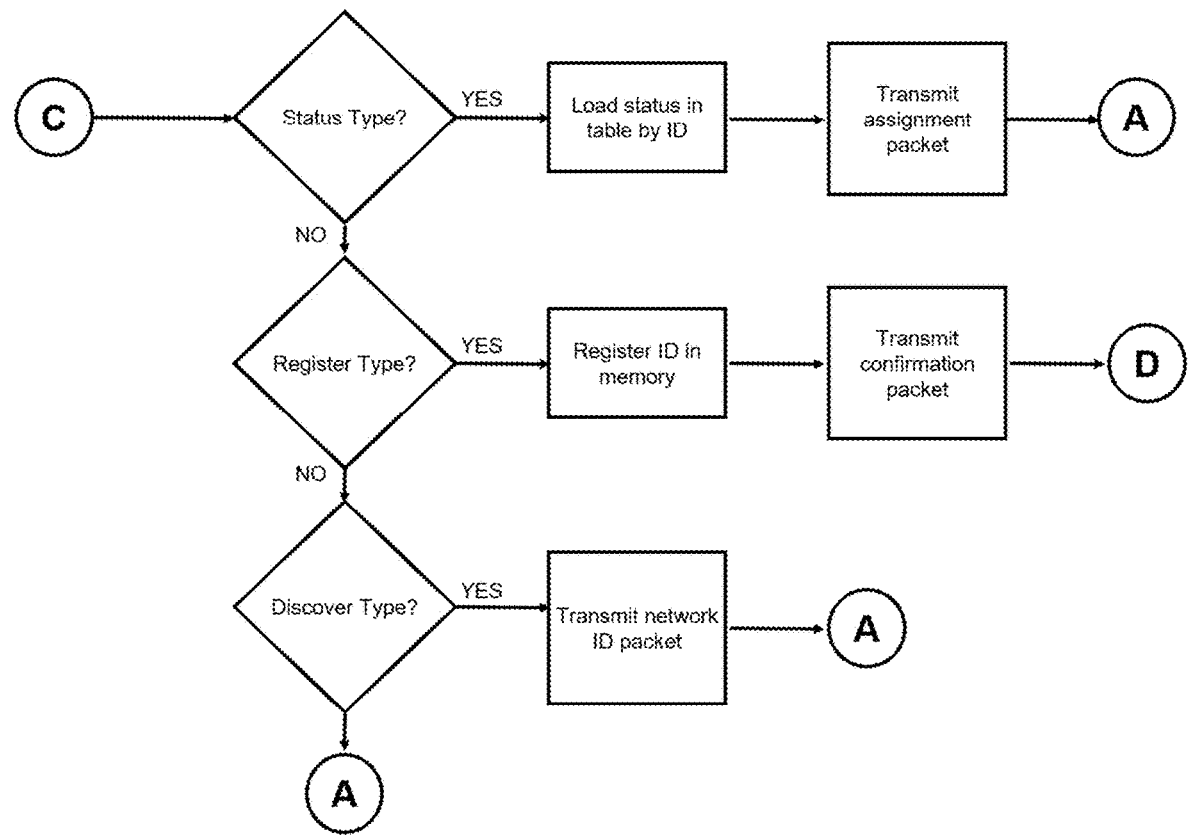

Referring now to FIGS. 7, 8 and 9, once the set of parameters are determined using the encoding algorithm, they are saved for later use. The hub 12 will monitor a communication port connected to the controller 18 to determine if there is a desired state change. For example, this could be triggered by an irrigation schedule to open or close a valve or a change of plan.

If a change is detected, then the hub 12 assembles an assignment map 126 (FIG. 5) using the desired state of all the valves in the network. The information in this map is arranged in a manner that follows the decoded indexes derived using the parameters provided by the encoding algorithm. The hub 12 then prepares or assembles a command packet 114 (FIG. 2) that includes but is not necessarily limited to the function parameters, assignment map, and network ID.

Once assembled to this point, the command packet 114 is updated with a broadcast time remaining value 122 (FIG. 2) and the packet is transmitted using alternate modulation. In one example, the command packet 114 is transmitted using inverse IQ LoRa modulation.

The hub 12 will continue to broadcast a plurality of command packets 114 with updated time remaining until the overall broadcast time has been exhausted. Once this occurs the hub 12 will check again for a state change.

If the hub 12 determines that there is no state change, then it will monitor for any incoming packets by enabling its receiver using normal modulation. In one example, the receiver will be configured in a manner to receive non-command packets (like status, register or discover packets) using normal IQ LoRa modulation.

If no packet is received, then the hub 12 will check for another state change. It should be understood that the controller state change detection and packet received detection can be operated as individual interrupt sources so that the hub 12 is operated as an event driven system rather than a sequential state machine so the operation can follow in a different order as what is indicated in FIG. 7.

Referring now to FIG. 9, when the hub 12 detects a new packet directed to itself from one of the other RTUs 14 in the network, then the format of the packet is checked to determine the next step.

If the format is a status type packet, then the RTU information is loaded into a table in memory according to its ID. The status information can include battery levels, signal strength and quality, sensor data, and error codes from the RTU 14. Once loaded, the hub 12 returns to the processes illustrated in FIG. 7 and described earlier.

In one example, the hub 12 acknowledges the status packet by transmitting an assignment packet to the RTU 14 where this packet contains a portion of the assignment map 126 that is appropriate for the RTU 14. In this manner, the assignment can be reinforced as a form of redundancy.

If the format is a register type packet, then the ID is added to the table of IDs that are registered in the memory within the hub 12 and a confirmation packet is returned to the RTU 14. Once this is complete, then a new set of function parameters are derived by running the encoding algorithm as illustrated in FIG. 7 and described earlier.

If the format of the received packet is a discover type packet, then the hub 12 is configured to respond in a random timing fashion with its network ID 40 as a way to advertise its presence.

Figure 10:
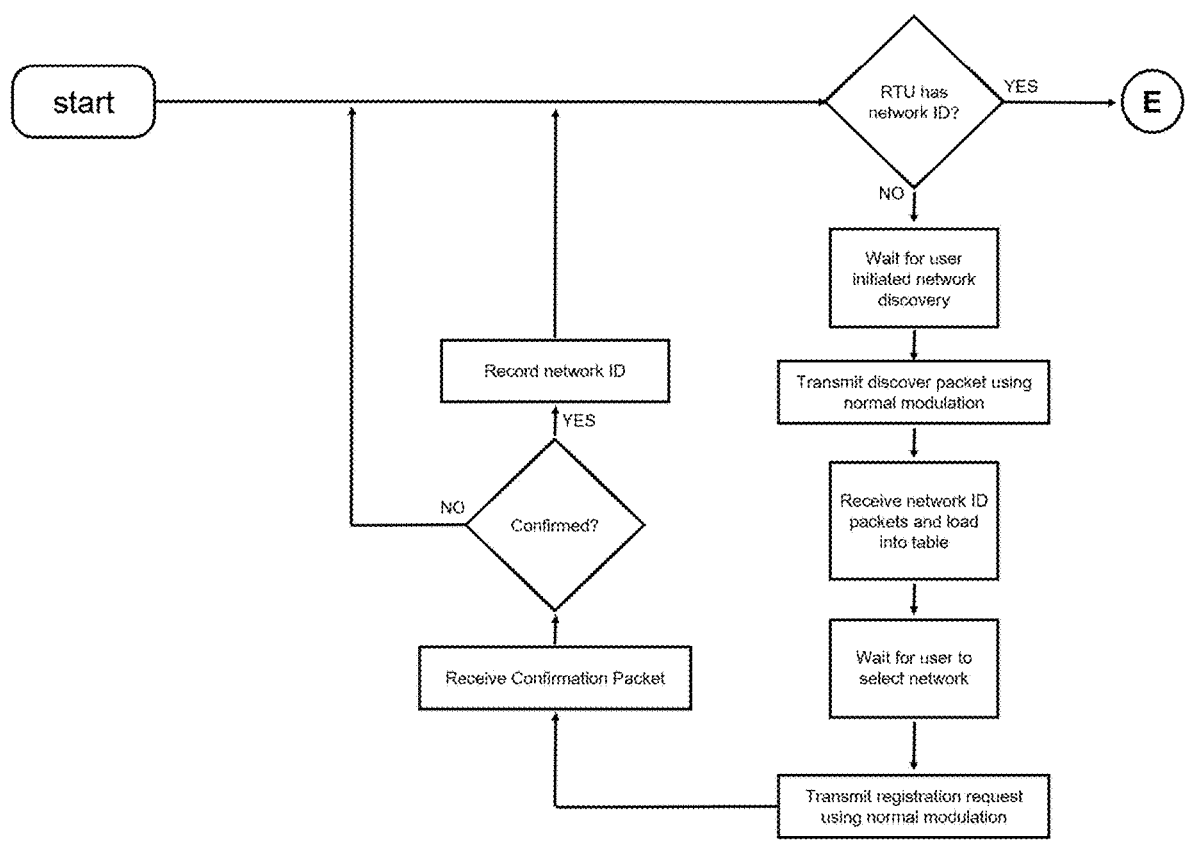
Figure 11:
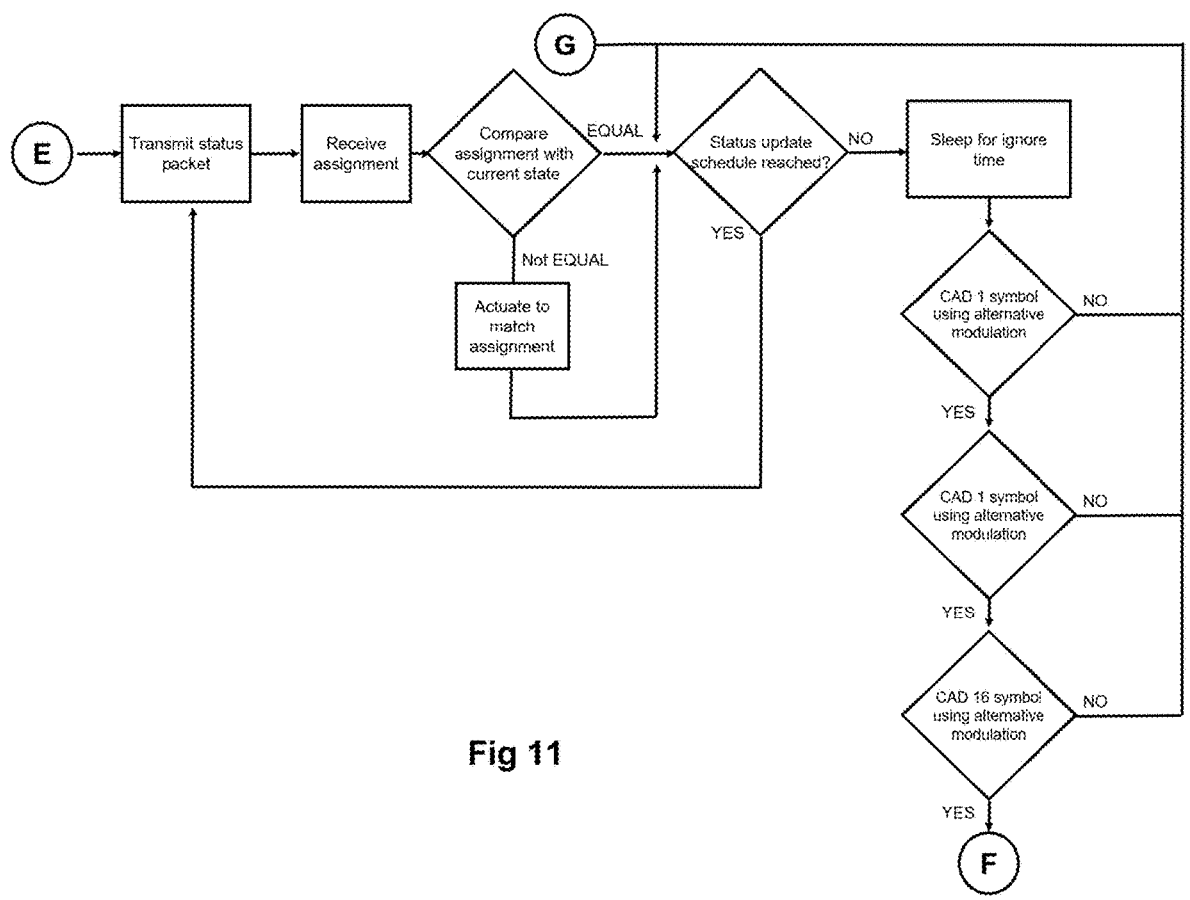
Figure 12:
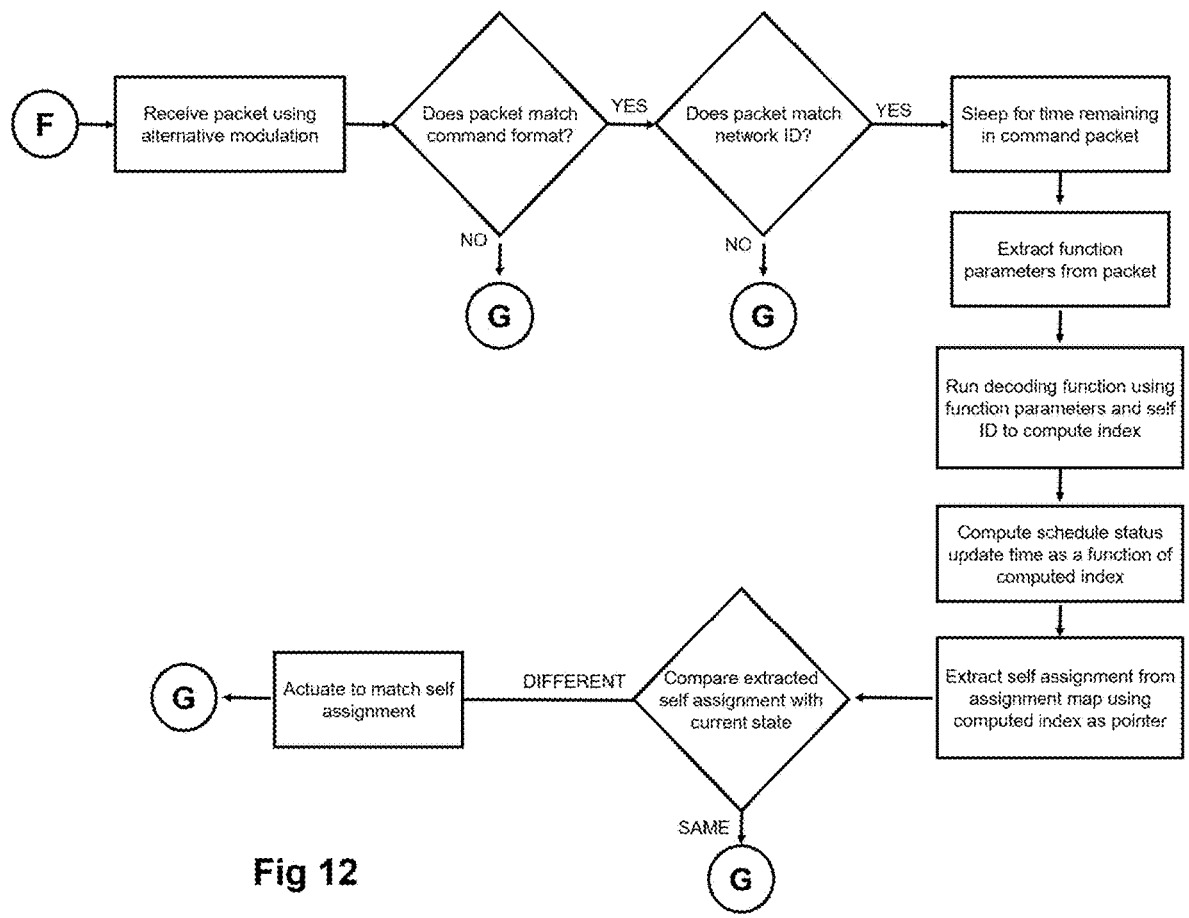

Operation of the RTU 14 is illustrated in flow-chart form in FIGS. 10, 11 and 12.

Referring now to FIG. 10, the RTU 14 performs an initial check at startup to determine if it has been assigned a network ID 40. If it has not been assigned, then a user can initiate a network discovery procedure to determine available networks in range. This procedure begins with the RTU 14 transmitting a discover packet. Each hub 12 within range of the RTU 14 will randomly respond with a network ID packet that contains the network ID 40 for the network associated with that hub 12. The RTU 14 is configured to receive these network ID packets from various hubs 12 and make this information available to a user. Once a user selects the desired network ID 40, the RTU 14 will prepare a registration request packet to send to the desired hub 12. The RTU 14 then waits to receive a confirmation packet from the hub 12. If the confirmation is successfully received, the RTU 14 records the network ID 40 in its own nonvolatile memory.

If the RTU 14 has a network ID 40, then the operation is best understood by inspecting FIGS. 11 and 12. Once the network ID 40 has been confirmed, the RTU 14 transmits a status packet to the hub 12 and waits to receive an assignment packet. Once this is received, if the assigned state is different than the current state, then the RTU 14 drives an actuator so that the two states match.

The RTU 14 is configured to periodically provide its status to the hub 12 at previously scheduled times. The schedule is derived in response to a command packet 114 where the status is provided in a time coordinated fashion as a function of its decoded and computed index.

In one example, an RTU 14 with an index of three, will have a scheduled time that is 250 msec earlier than an RTU 14 with an index of four. If there is no command packet received for some predetermined period of time, the RTU 14 is configured to volunteer its status over a longer time period, but still during a time that is a function of its computed index. In this case, an RTU 14 with an index of three will have a scheduled time that is 2500 msec earlier than an RTU 14 with an index of four.

If the RTU 14 scheduled time has not been reached, then the RTU 14 will sleep for the ignore time. In one example, this time is 250 msec. Once the ignore time has been exhausted, the RTU 14 configures its wireless receiver to use a single symbol channel activity detect (CAD) mode to check for activity on the channel. In this case, the CAD is configured to respond to signals only using the alternative modulation.

If the receiver detects activity on the channel, then it will check a second time using a single symbol CAD mode to again check for activity on the channel. If this second check confirms that there is activity on the channel, then it will check for a third time checking for sixteen symbols on the channel. If any of these three checks do not detect activity on the channel, the operation returns to continue to check the schedule followed by a sleep for the ignore time as shown in FIG. 11. If this third check detects activity on the channel, then the operation is best understood by inspection of FIG. 12. It should be understood that there are other combinations of CAD symbol checks that can be successfully implemented.

The RTU 14 is configured to switch from a CAD mode to receive mode after the three successful detections of activity on the channel using alternate modulation. Once a command packet 114 is successfully received, it is evaluated first to determine if it matches the command format. If it does not, then the operation returns to the schedule check in FIG. 11. If the format matches the command format, then the received packet is checked to determine if the received network ID matches the RTU 14 network ID 40. If this does not match, then operation returns to the schedule check in FIG. 11. If the network ID matches, then the time remaining value is extracted from the command packet 114 and the RTU 14 is designed to sleep for the time specified as a power conservation measure.

Once the RTU 14 has been asleep for the time remaining period, it will wake up and extract the function parameters from the command packet 114. The RTU 14 then computes its index from the decoding function using the received and extracted function parameters and its RTU ID 36. An updated status schedule is derived using this computed index.

The command packet 114 also includes the assignment map as described earlier. The computed index acts as a pointer to extract the relevant portion of the assignment map for the RTU 14 with the ID 36. This relevant portion is a self assignment and represents a desired valve state or actuator position for the specific RTU 14. If the received and extracted self assignment is the same as the current assignment or state, then the RTU 14 resumes operation as illustrated in FIG. 11. If the received assignment differs from the current assignment, then the RTU 14 actuates or drives the valve to match the intended state. During this time, the RTU 14 resumes the schedule check operation as illustrated in FIG. 11.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. An irrigation system, comprising:
   a network hub;
   a plurality of remote terminal units configured for wireless communication with the network hub, each of the plurality of remote terminal units being connected to a device for irrigation control or sensing;
   the network hub having a computer processor and a memory having stored programming instructions operable by the computer processor to cause the network hub to transmit a wireless broadcast to the plurality of remote terminal units;
   the wireless broadcast including a plurality of individual packets transmitted in succession for a broadcast period of time, each of the plurality of individual packets including:
     a network identifier associated with the network hub;
     a time remaining in the broadcast period of time; and
     an assignment map, the assignment map indicative of an assigned state for each of the plurality of remote terminal units.

2. The irrigation system of claim 1, wherein the device for irrigation control or sensing comprises one or more of a valve, a solenoid, a pressure switch, or a sensor.

3. The irrigation system of claim 1, wherein each of the plurality of individual packets further comprises a format type value.

4. The irrigation system of claim 1, further comprising a remote identifier associated with each of the plurality of remote terminal units.

5. The irrigation system of claim 4, wherein the remote identifier is a remote terminal identifier which identifies a particular one of the plurality of remote terminal units.

6. The irrigation system of claim 4, wherein the remote identifier is a device identifier which identifies a particular one of the devices for irrigation control or sensing.

7. The irrigation system of claim 4, wherein each of the remote identifiers is stored in the memory, and wherein the stored programming instructions are configured to cause the computer processor to apply an encoding function to each of the remote identifiers to produce a set of function parameters, and wherein each of the plurality of individual packets further comprises the set of function parameters.

8. The irrigation system of claim 7 wherein the encoding function operates to produce a first data size of the set of function parameters which is smaller than a second data size of the plurality of remote identifiers.

9. The irrigation system of claim 7, wherein the encoding function is a hash function.

10. The irrigation system of claim 7, wherein each of the plurality of remote terminal units is configured with a decoding function operable to decode the set of function parameters using a decoding identifier.

11. The irrigation system of claim 10, wherein the decoding identifier is the remote identifier.

12. The irrigation system of claim 7, wherein the encoding function is further configured to produce a unique computed index for each one of the remote identifiers.

13. The irrigation system of claim 4, wherein each of the remote terminal units is configured to transmit a status packet to the network hub in accordance with the unique computed index.

14. The irrigation system of claim 4, wherein each of the remote terminal units comprises a current state for the connected device for irrigation control or sensing, each of the remote terminal units further being configured to compare the current state to the assigned state and to cause the connected device to match the assigned state.

15. An irrigation system, comprising:
   a network hub;
   a plurality of remote terminal units configured for wireless communication with the network hub, each of the plurality of remote terminal units being connected to a device for irrigation control or sensing, each of the remote terminal units having a remote identifier;
   the network hub having a computer processor and a memory having stored programming instructions operable by the computer processor to apply an encoding function to each of the remote identifiers to produce a set of function parameters;
   the stored programming instructions further being operable to cause the network hub to transmit a wireless broadcast to the plurality of remote terminal units, the wireless broadcast including a plurality of individual packets transmitted in succession for a broadcast period of time, each of the plurality of individual packets including:
     a network identifier associated with the network hub;
     a time remaining in the broadcast period of time;
     the set of function parameters; and
     an assignment map, the assignment map indicative of an assigned state for each of the plurality of remote terminal units.

16. The irrigation system of claim 15 wherein the encoding function operates to produce a first data size of the set of function parameters which is smaller than a second data size of the plurality of remote identifiers.

17. The irrigation system of claim 16, wherein the encoding function is a hash function.

18. The irrigation system of claim 17, wherein each of the plurality of remote terminal units is configured with a decoding function operable to decode the set of function parameters using a decoding identifier.

19. The irrigation system of claim 18, wherein the decoding identifier is the remote identifier.

20. The irrigation system of claim 16, wherein the encoding function is further configured to produce a unique computed index for each one of the remote identifiers.

21. The irrigation system of claim 16, wherein each of the remote terminal units is configured to transmit a status packet to the network hub in accordance with the unique computed index.

22. The irrigation system of claim 16, wherein each of the remote terminal units comprises a current state for the connected device for irrigation control or sensing, each of the remote terminal units further being configured to compare the current state to the assigned state and to cause the connected device to match the assigned state.

23. The irrigation system of claim 16, wherein each of the plurality of individual packets further comprises:
 a network identifier associated with the network hub; and
 a time remaining in the broadcast period of time.

24. An irrigation system, comprising:
 a network hub;
 a plurality of remote terminal units configured for wireless communication with the network hub, each of the plurality of remote terminal units being connected to a device for irrigation control or sensing;
 the network hub having a computer processor and a memory having stored programming instructions operable by the computer processor to cause the network hub to transmit a wireless broadcast to the plurality of remote terminal units;
 the wireless broadcast including a plurality of individual packets transmitted in succession for a broadcast period of time, each of the plurality of individual packets including:
  a network identifier associated with the network hub;
  a time remaining in the broadcast period of time;
  an assignment map, the assignment map indicative of an assigned state for each of the plurality of remote terminal units; and
  a set of function parameters, the set of function parameters being usable by the plurality of remote terminal units to determine the assigned state from within the assignment map corresponding to each separate one of the plurality of remote terminal units, and further to derive a unique time for providing a status response by each separate one of the plurality of remote terminal units.

25. The irrigation system of claim 24, wherein each of the remote terminal units further comprises a remote identifier, and wherein the remote terminal units are configured to apply a decoding function to derive a unique index as a function of the function parameters and the remote identifier.

26. The irrigation system of claim 25, wherein each of the remote terminal units is further configured to determine the assigned state based on the unique index.

27. The irrigation system of claim 25, wherein each of the remote terminal units is further configured to determine the unique time based on the unique index.

28. The irrigation system of claim 25, wherein each of the remote terminal units is further configured to determine the assigned state and the unique time based on the unique index.

29. The irrigation system of claim 28, wherein the network hub is further configured to receive the status response from the plurality of remote terminal units during a response period of time, the response period of time occurring after completion of the broadcast period of time.

30. The irrigation system of claim 29, wherein the response period of time further occurs after an actuate period of time, the actuate period of time occurring after completion of the broadcast period of time.

31. The irrigation system of claim 30, wherein the plurality of remote terminal units are further configured to perform an action in accordance with the assigned state during the actuate period of time.

* * * * *